METHOD OF AND APPARATUS FOR SLICING POTATOES

Original Filed Feb. 15, 1963 6 Sheets-Sheet 1

INVENTOR
Frank G. Lamb

BY Thomas, Weisman & Russell
ATTORNEYS

METHOD OF AND APPARATUS FOR SLICING POTATOES

Original Filed Feb. 15, 1963 6 Sheets-Sheet 2

INVENTOR
Frank G. Lamb

BY Thomas, Weisman & Russell
ATTORNEYS

METHOD OF AND APPARATUS FOR SLICING POTATOES

Original Filed Feb. 15, 1963 6 Sheets-Sheet 3

INVENTOR
Frank G. Lamb

BY Thomas, Weisman & Russell
ATTORNEYS

METHOD OF AND APPARATUS FOR SLICING POTATOES

Original Filed Feb. 15, 1963 6 Sheets-Sheet 1

INVENTOR
Frank G. Lamb

BY Thomas, Weisman & Russell
ATTORNEYS

METHOD OF AND APPARATUS FOR SLICING POTATOES

Original Filed Feb. 15, 1963 6 Sheets-Sheet 5

INVENTOR
Frank G. Lamb

BY Thomas, Weisman & Russell

ATTORNEYS

METHOD OF AND APPARATUS FOR SLICING POTATOES

Original Filed Feb. 15, 1963 6 Sheets-Sheet 6

INVENTOR
Frank G. Lamb

BY
Thomas, Weisman & Russell
ATTORNEYS

United States Patent Office

Re. 26,796
Reissued Feb. 17, 1970

26,796
METHOD OF AND APPARATUS FOR SLICING POTATOES

Frank G. Lamb, Lake Oswego, Oreg., assignor to Lamb-Weston, Inc., Weston, Oreg., a corporation of Oregon Original No. 3,217,768, dated Nov. 16, 1965, Ser. No. 258,822, Feb. 15, 1963, which is a continuation of application Ser. No. 582,184, Sept. 1, 1966. Application for reissue Jan. 29, 1969, Ser. No. 802,293
Int. Cl. A23p *1/00;* B26d *1/02*
U.S. Cl. 146—241 12 Claims

Matter enclosed in heavy brackets [ ] appears in the original patent but forms no part of this reissue specification; matter printed in italics indicates the additions made by reissue.

*ABSTRACT OF THE DISCLOSURE*

*A vegetable cutting apparatus and method wherein the product is successively subjected to three cutting stages, the first removing part of the side slabs, the second removing the remaining side slabs and longitudinally center cutting the center portion of the product and the third stage longitudinally center cutting the center portion in a direction at right angles to the first longitudinal center cut.*

*This application is a continuation of my copending reissue application Ser. No. 582,184, now abandoned, of Patent No. 3,217,768.*

This invention relates to a means and method for the cutting of various types of vegetables, and more particularly to a mechanism most suitable for the slicing or cutting of potatoes into predetermined sizes and shapes. The invention is particularly adapted to treatment of the tuber in the sense that various alternate operations may be performed thereby to obtain a sliced product of different shapes and sizes. As to potatoes in particular, the same are commonly sold as diced, string French fried or crinkle cut French fried. The product frequently appears upon the market as a frozen product which when thawed is immediately ready for consumption, in which case the product may be precooked, or blanched, etc., as desired.

The improved device of this invention enables a manufacturer of French fried potatoes to obtain a maximum yield of long, uniform, cross-sectional area cuts while at the same time permitting diversion of the less desirable cuts (such as the exterior slabs) to other uses. The several cutting operations are accomplished with minimum damage to the cells of the potato.

There have been many devices proposed for the purpose of cubing or slicing of potatoes and in particular, mechanisms of the so-called rotary blade type are common, although other arrangements have been suggested for this same purpose. However, in most if not all of these instances, the cutting mechanism itself is most generally of a very complex sort, requiring many moving parts and consequently, the same involve relatively high fabrication cost as well as relative difficulty of repair or replacement.

Such existing and previously used commercial methods, in utilizing the motor driven circular slicers mentioned above involve the cutting of the potato first in one plane and then in another. The result is an almost infinite number of sizes and shapes, consequent upon the desire to obtain maximum yield and also necessarily so because of the many varieties of shapes of the raw product—the potato. In some homes and commercially in restaurants, the potatoes are cut by forcing them through a wire, rectangular-like grid. However, in such instances it is not possible to design a device strong enough to enable the processing of potatoes at high speeds with retention of the cutting edge, and without damage to the structure of the potato. In the instant case, each of the cutting stages requires the use of cutting knives which have a triangular section as the cutting edge comprises a preferred angle of approximately 8°. With particular reference to the knives used for dividing the center cut portions, such cutting knives are arranged in different planes, thereby further facilitating the cutting opeartion, which in the use of the instant device is accomplished in rapid sequence at a high rate of speed. The side of the blade toward the center in each case is parallel to the center line, or to the center axis of movement of the product. This arrangement of the invention attains the most efficient separation of the slabs as well as rapid and efficient cutting of the center cut sections without substantial damage to the product.

It is also to be observed as a matter of further orienting background that most, if not all, prior art mechanisms do not provide a means for the preparation of purely center cut products. In known vegetable cutting arrangements the skin portion of the potato is included in the output of the machine. Of course modern production includes means to clean the skin and some times even by certain abrasive methods to remove some portion of the outer skin and other impairments thereof such as the eyes, rotted surface portions of the potato, etc. In any event, the mechanism of the instant invention assures complete removal of any imperfection since the outer portion of the vegetable is completely removed by an exterior slab cutting operation with only the inner or so-called "center cut" portion remaining as the product most suitable and desirable for consumption.

This does not mean that the slab or exterior portions which are removed are completely discarded as unfit or unusable portions of the tuber. In the modern plant equipment in which the instant invention is visualized as most adaptable for high production output such exterior or slab portions may be routed to other processing stages, such as procedures used for the production of mashed potatoes where imperfections in such slab portions are removed in the course thereof and the remaining part of these exterior parts of the tubuer fully prepared for human consumption as, for example, a dehydrated mashed potato product.

It is emphasized that a primary advantage and benefit of the assembly representing the instant invention is the fact it is representative of the very essence of simplicity. The comparative size of the apparatus here employed, in its preferred embodiment, may be gathered from the fact that the first figure of the drawings hereof is roughly about one-third of the size of the mechanism suitable for plant installation. Further, the entire unit can be mounted upon a single baseboard, as it is here shown and described, which permits ease of disassembly for cleaning or replacement of other purposes.

As indicated, another primary objective of the invention is the provision of an automatic apparatus adapted for optional use; the output may be either diced or cubed potatoes, French fried potatoes of the straight or string type, or so-called "crinkle cut" French fried potatoes. In the latter cateogry the product is identified by its elongated shape, each side of which, and optionally each end of which, has a characteristic wavy or corrugated pattern. In the explanation of the instant invention which follows, the same is described with particular reference to the production of "crinkle cut" French fried potatoes. At any rate, although the mechanism of the invention is most ideally suited for the preparation of potatoes, its adaptability to the slicing or cutting of other vegetable products into such shapes as already mentioned, should be apparent to those skilled in the art.

An additional objective of the invention is the provision of mechanism of the type generally referred to above wherein the entire operation is completely automatic, each cutting operation, of which there are four, following in rapid sequence with each succeeding potato pushing the preceding potato through the several blade arrangements. In this respect rapid feeding is accomplished by a series of pistons or push rods adapted to rapidly reciprocate and to successively feed each potato through the series of blade arrangements. Such pushers or pistons are actuated by a novel linkage or lever mechanism, the same being actuated by a single rotating shaft. In relation to this aspect also, it is to be observed that the several reciprocating plungers for performing each cutting step resulting in the ultimate prepared product, are automatically timed with respect to each other (through such linkage), that the entire operation proceeds continuously, smoothly and with great rapidity. Other means, such as pneumatically or hydraulically operated drive means, can also be utilized in driving the several reciprocating plungers to attain the several cutting or slicing functions.

Another object of the invention is the provision of means as heretofore identified which, as indicated, not only permits rapid disassembly for cleaning or other purposes, but which perhaps even more significantly, enables complete ease of removal of the individual blades for the sharpening thereof or for other purposes, as a change from corrugated to straight blade operation. This is accomplished by means which so mount these several blades as to permit the operator to remove the individual locking mechanism thereof and slip the blades from the assembly without breakdown of any of the other major components thereof. It is also to be appreciated with regard to this aspect of the invention that although the same is here illustrated as utilizing blades to prepare an elongated, corrugated or crinkle cut type of potato, the removal of such blades permits same to be substituted by straight blades, so that the ultimate product is more similar to the ordinary type of, for example, French fried potatoes, which exhibit a rectangular shape with flat opposing sides. Again, an optional number of blade supports with respect to each cutting operation may be provided; thus, whereas the invention is here more particularly illustrated with respect to the blade set up for the production of crinkle cut potatoes, the addition of several more blades at the last cutting stage will result in production of the so-called diced or cubed potato.

A further object of the invention is the provision of means, in an asssembly of the described type, to guide each individual vegetable, e.g., a potato, in accurate axial alignment through the initial cutting means, such guide mechanism taking the form of opposed guide members which are provided with spring bias normally tending to force same together, but when impacted by a potato, are forced outwardly in equal and proportionate amounts on each side of the axis of motion. The result is perfect alignment of the potato as it impinges upon the first cutting media, used for the purpose of removing the initial, exterior slab portions.

Finally and as emphasized, a basic advantage of the invention lies in the provision of mechanism representative of the essence of simplicity, while at the same time providing an assembly which lends itself to automatic, high speed production of a sliced vegetable product of predetermined size and shape, the speed of operation being of such rapidity to enable an output of comparatively great magnitude. At the same time, the ultimate product, as aforesaid, is more desirable than the product heretofore obtainable by previous devices since the same is always representative of a center cut of the tuber, and always exclusive of any undesirable portions of the natural vegetable, such as skin, eyes and other imperfections.

Further fundamental advantages are derived from the absolute uniformity of the ultimate product resulting from the several cutting operations of the invention. The resultant uniform cross section, whether the product takes the form of diced, French fried or string potatoes, or crinkle cut potatoes, permits uniform frying which is true also when the product is reheated or the frying is continued by the user prior to consumption. Such uniformity is also conducive to ease of packaging. Again, because the slab portions are initially removed with only the center cut portions remaining the product is purer, in the sense that it is completely absent of chips, splinters, etc. It is significant also that the referred to initial slabbing of the potatoes substantially reduces hand labor, for the eyes, rotted spots, etc., remain in the slabs which, as indicated above, are handled mechanically for the production of such by-products as dehydrated mashed potatoes. Production is also rendered less expensive for the additional reason that with the practice of the present invention, smaller potatoes may be used or tubers of a size which commonly are referred to as culls, not heretofore considered suitable for making French fries. With ordinary methods of production such smaller potatoes produce an excess of splinters and fines; in the use of this invention this does not occur.

Other objectives and advantages will be apparent to those skilled in the art upon consideration of the more detailed explanation of this invention which follows, the description thereof being made with reference to the following drawings of the invention, wherein.

Figure 1:
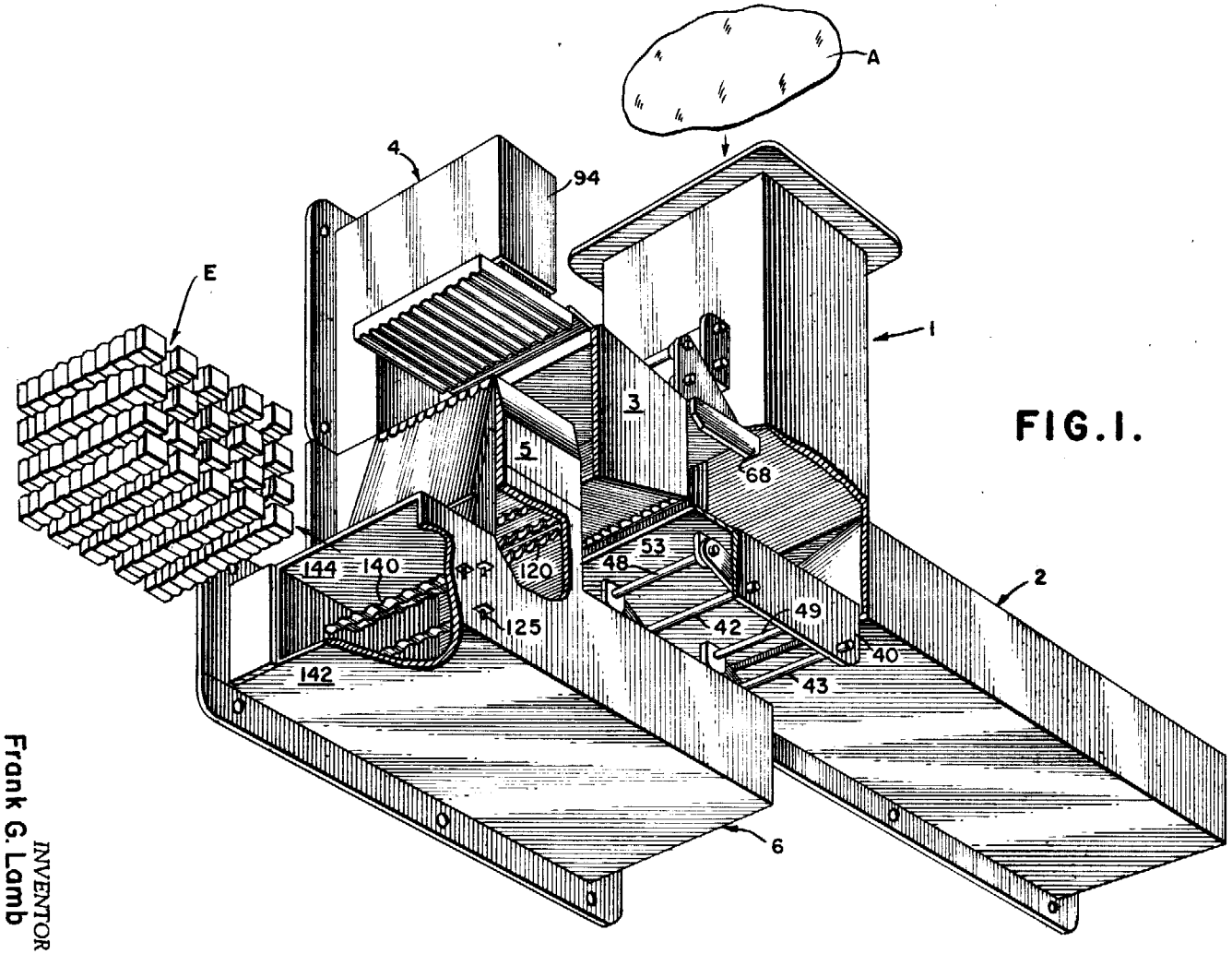
FIGURE 1 is a perspective view of the invention which pictorially illustrates the relative position of the cutting components and shows also the relative compactness and simplicity of the novel assembly.

Referring more particularly to these drawings, FIGURE 1 depicts the general arrangement of the assembly, showing the relative positioning of the several cutters with respect to each other. Commencing with the raw product, as indicated at A and here a potato, the latter is shown as being discharged from a suitable source into the hopper generally indicated at 1. It emerges at E in its final form, i.e., in the form of a substantially rectangular cant, the particular type of cutting knives here utilized cutting the potato into twenty center cut portions, each of which is corrugated or crinkled upon each of its six sides.

The casing, generally indicated at 2, contains the first push rod or reciprocating piston assembly used for successively forcing each potato as it drops into position from the hopper 1 before a thrust mechanism, to be described, which pushes it to left (as here shown) for impingement upon the cutter blades, arranged to make the first cut which cut removes the four exterior and longitudinal slab portions from the potato.

After these slabs are removed, a following potato drops into place behind the one just cut. Reciprocation of the push rod in a like manner causes the slabbed potato to be forced completely through the first cutter 3 and in a position immediately underneath the push rod or reciprocating piston assembly 4. The latter, motivated by suitable timed mechanism to be later described, is caused to move downwardly to place the potato which has been slabbed into contact with the second cutting mechanism. The two end slabs are removed by the latter.

The following potato, when so impulsed by the second reciprocating mechanism forces that product which has been completely slabbed on all six sides into contact with the third cutting mechanism 5.

Finally, having been cut lengthwise in one direction by the blades illustrated in FIGURE 1 of the cutter mechanism 5, the potato is positioned for further slicing immediately in front of the blades located in the housing 6 for another lengthwise cut. The same type of reciprocating mechanism positions a following potato into position behind the product to receive the final cut and with reciprocation of this thrust mechanism, such following potato causes the initial product to be forced through these final cutting blades, with the result that the final product is representative of the twenty slices or segments shown at E of FIGURE 1.

With proper timing of the several piston assemblies so that reciprocations of each are timed with the reciprocations of the others, the entire cutting operation is accomplished with great rapidity and not more than a few second's time from beginning to end.

Figure 2:
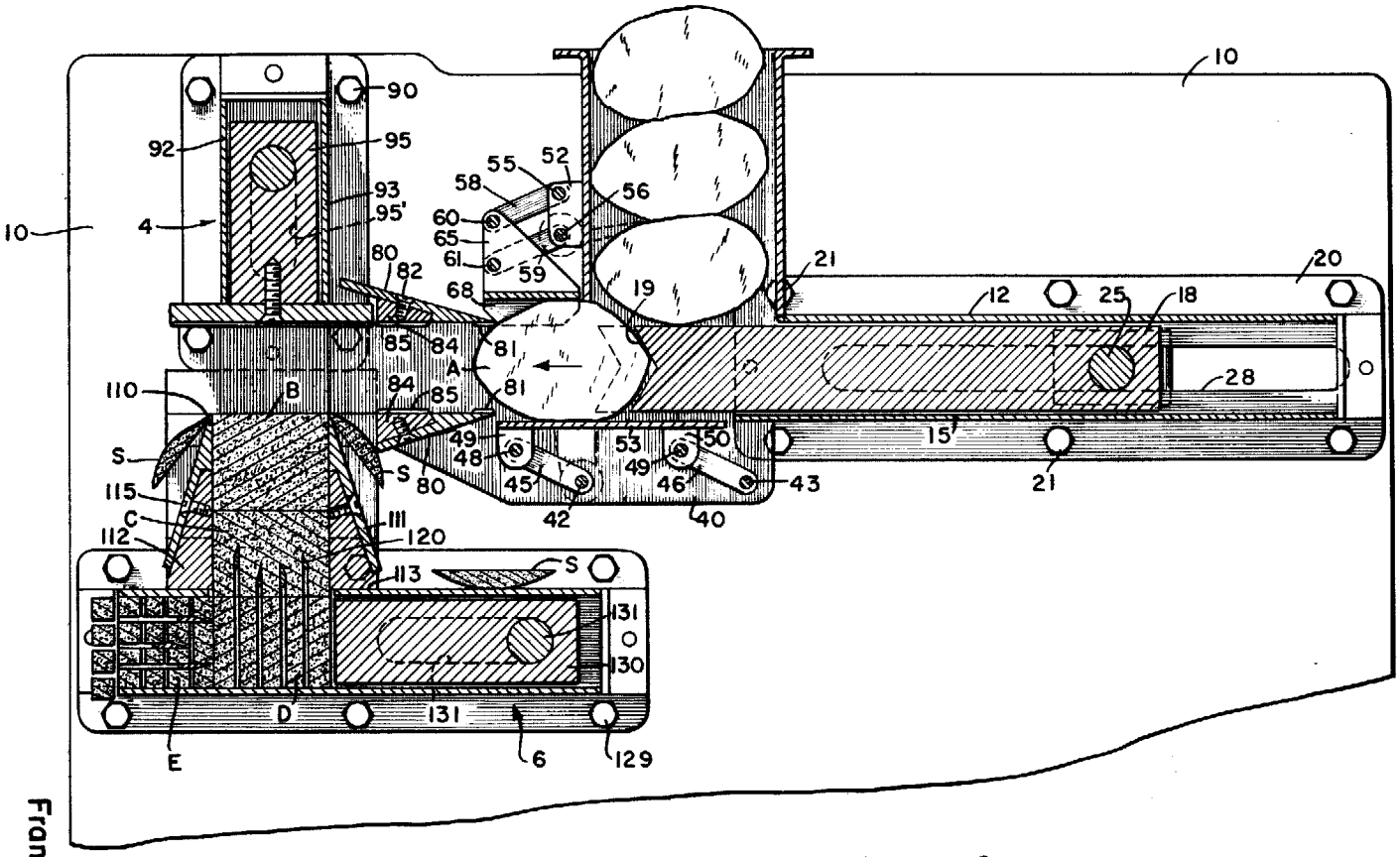
FIGURE 2 is a section view of the invention, in elevation, as it is shown in FIGURE 1.
Figure 6:
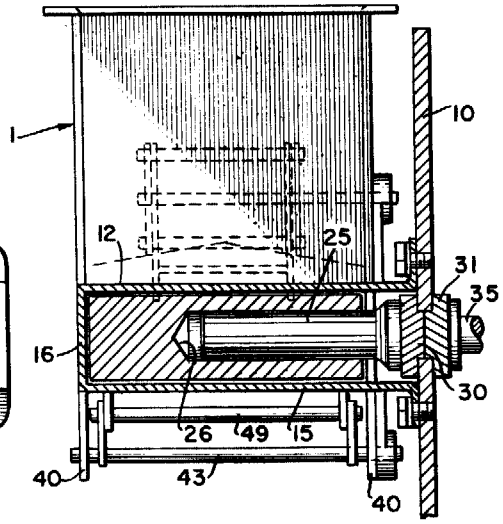
FIGURE 6 is a section view taken on the line 6—6 of FIGURE 3.
Figure 9:
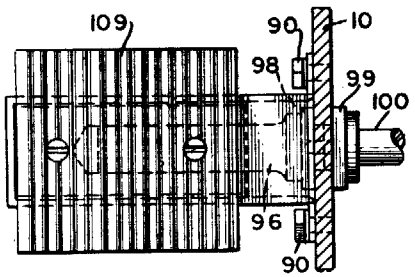
FIGURE 9 is a bottom plan view of the second feeding mechanism as shown in FIGURES 7 and 8.
Figure 5:
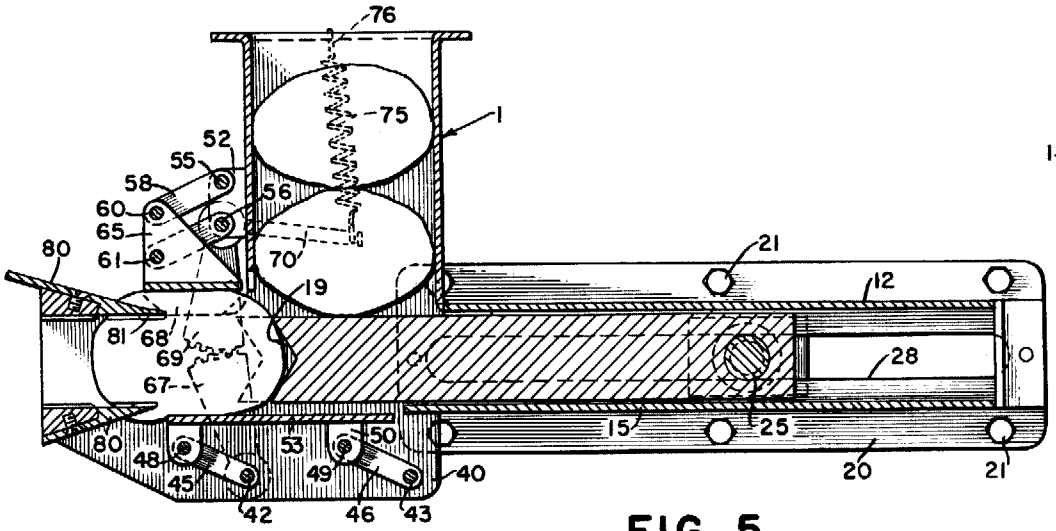
FIGURE 5 is a view similar to FIGURE 4, also in section, illustrating the same potato being forced by the pusher mechanism against and into contact with the first cutting means, whereby the slabs are removed.
Figure 8:
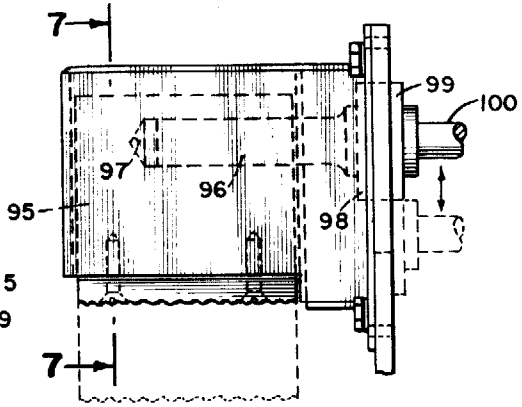
FIGURE 8 is a side elevation view of said second pusher mechanism.

As shown more particularly in FIGURES 2, 5 and 6, the product is charged from a suitable source to the hopper 1. In this representation of the invention and as indicated in FIGURE 2 a total of four potatoes are shown in the process of being segmented into twenty strips or "crinkle cut" slices.

Potato A is indicated as positioned in cutting position for removal of the longitudinal slab portions; potato B has already been squared, i.e., the longitudinal slabs have been removed by the first cutting operation, and in the second, the two end slabs are being removed; potato C has been completely cut with all slabs removed upon all six sides and is shown as being partially cut by the third series of cutting blades, segmenting the potato into five slabs or strips; potato D, having been forced into the position shown by the following product, has already been cut by the third series of blades into these five portions; preceding potato D, potato E has been positioned nearly all the way through a fourth series of cutting blades, the latter product being ultimately discharged into the form shown in FIGURE 1, i.e., in the form of a segmented, rectangular cant.

As will be seen, all of these cooperating piston and cutting assemblies are mounted upon a common upright base member 10.

The initial reciprocating mechanism, piston or push rod assembly, is housed within a suitable housing 2 formed of top and bottom walls 12 and 15, and side wall 16. The plunger 18 is rectangular in cross-sectional configuration and at one end provided with a groove or dished formation 19 approximating the contour of the product as the same is shown in position in, e.g., FIGURE 2, whereby the product is firmly held during cutting.

Figure 3:
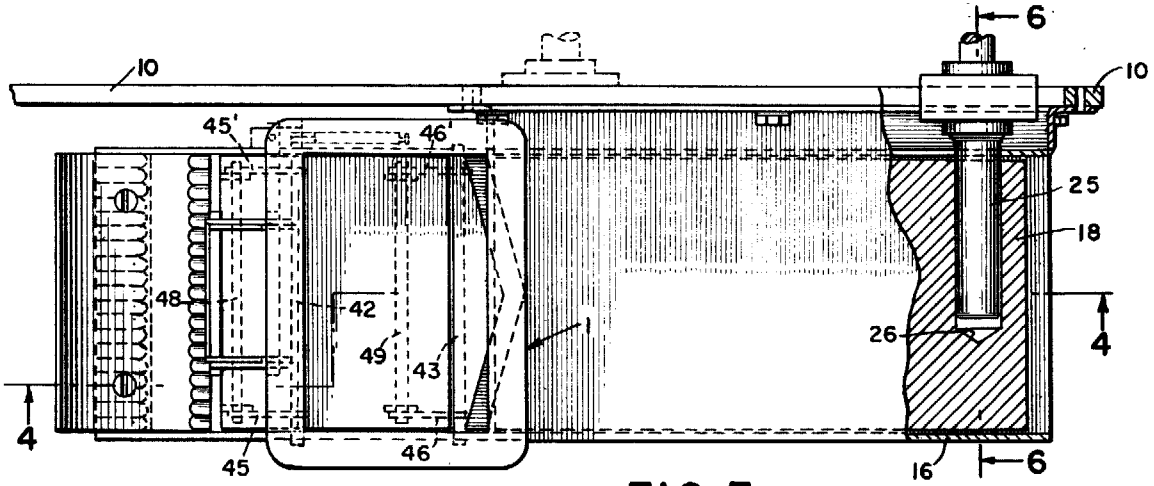
FIGURE 3 is a top plan view of the invention particularly showing the manner of mounting of the slide mechanism used to reciprocate the several piston or pusher devices for feeding of the product through the several cutters.

This housing 2 is flanged as at 20 and secured to the metal base 10 in any suitable fashion, as by bolts 21. The piston 18 is reciprocated by means a drive pin 25 that is fitted within a suitable bore 26 in the piston 18, as more particularly shown in FIGURE 6. The baseboard 10 is slotted as at 28 so that the pin 25 can be slidably mounted within such slot for reciprocatory purposes. The specific mechanism permitting this is found in two similarly shaped bushings 30 and 31 which are mounted upon the drive pin 25 and provided with facing flanges of a diameter to slidably ride in slot 28. When positioned as shown and secured in place they bear against the respective inner and outer surfaces of the base member 10, with the respective flanges being journaled in slot 28. The drive pin 25 is provided with any suitable form of extension or additional drive rod 35 to which is attached the required mechanism (hereinafter described) for reciprocating the piston 18 the desired distance, and in timed relation with respect to the other two reciprocating mechanisms to render the series of cutting operations sequential and synchronized. The extent of reciprocatory travel of the piston 18 is represented by the dotted line showing of FIGURE 3.

The over-all height or thickness of the piston 18 is such as to permit same to easily reciprocate within chamber 2; its dimension is also such as to permit it to fit between the knives forming the first slab cutters, so that the product can be propelled all the way therethrough.

Means are provided to assure centering of each potato as it proceeds toward these first of the cutter blade arrangements and this means is found in two guides which are positioned on each side of the potato. The latter are so interlocked that each travels an equal distance outwardly when the product is forced therebetween. The lower guide (as seen in FIGURE 2) is mounted upon suitable flanges 40 which may be made integral with, for example the casings forming part of the hopper 1. These flanges support two spaced pins or pivots 42 and 43, the latter being provided with link 45–45' and 46–46' which interconnect with complementary pivots 48 and 49. The lower guide 53 has affixed thereto two pairs of lugs such as those indicated at 49 and 50, such lugs being apertured to receive the referred to pivot pins 48 and 49, and the entire arrangement taking the form of a linked parallelogram which will permit inward and outward movement of the lower guide 53 but retain such guide in a plane parallel to the axis of movement of the pusher 18.

Similarly, two spaced lugs 52, upon being suitably welded or otherwise affixed to the interior of the hopper 1, provide support for pivots 55 and 56 which through links such as those shown at 58 and 59 are interconnected to complementary pivot pins 60 and 61. The latter are seated in vertical flanges 65 provided upon the upper guide member 68. Here again this linkage arrangement takes the form of a parallelogram permitting inward and outward movement of the upper guide 68 the required amount to permit passage of the product therethrough, with such movement being confined to a plane which is always parallel to the axis of movement of the pusher or piston 18. Both guides 53 and 68 are preferably rounded or contoured to approximate the exterior shape of the product.

As stated, the two guides 53 and 68 are linked together in such fashion that movement of either one produces corresponding movement of the other. To this end there is keyed to the pivot pin 42 of the lower guide a pinion arm or rack 67 having appropriate teeth along its inner edge adapted to mesh with a similar rack element 69. The latter is in like fashion keyed to pivot pin 56 of the upper guide. Hence any movement of one rack element will produce a corresponding and like movement in the other rack element.

Figure 4:
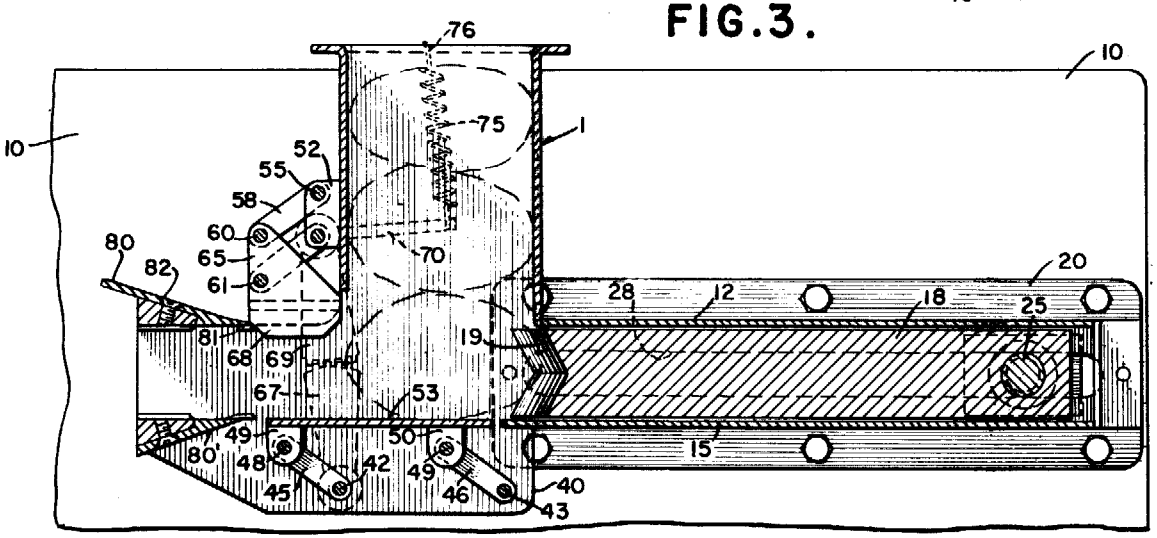
FIGURE 4 is a section view taken on the line 4—4 of FIGURE 3 illustrating the bottommost of a charge of potatoes from the hopper positioned for immediate feeding through the guide means for impingement upon the first cutting knives for removing the exterior slab portions.

The two guides are biased so that they continually tend to return to a center position, as such is indicated in FIGURE 4 when there is no product positioned therebetween. This is accomplished by providing an arm 70 which is secured to one end of the pivot pin 56. The other end of the arm 70 engages one end of a tension spring 75, the other end of such spring being secured for example, and as indicated by hook means 76, to the hopper in any suitable fashion.

The first stage of the cutting procedure involves removal of the sides or "slabs" from the potato. This is done by an arrangement of four cutting elements or knives, the top and bottom ones of which are respectively indicated at 80 (FIGURE 2). Such knives 80 have a "crinkle-cut" contour, as indicated at 81. These are secured by screws 82 upon suitable supports 84 which are in turn affixed to the back wall 10 in any suitable fashion. Similar blades (not shown) are located on each side to remove the side slabs from the tuber. All four blades are arranged to form the housing 3 as it is indicated in FIGURE 1. Each blade terminates in an edge 81 which is corrugated or shaped to form the cut portions with the wavy or "crinkle" cut, this type of product involving the particular type of operation as to which the invention is more particularly described herein. Preferably, the angularity of the cuttings edges 81 is about 8°.

In FIGURE 4 the pusher or feeder element 18 is shown in its fully retracted position. On the other hand in FIGURE 2 the piston 18 is illustrated at a position about half way through its forward movement, the potato with which it engages at this point just contacting the blades 80. Actually the full stroke of the piston 18 carries the leading or contacting surface of same (the surface 19) to a point substantially past the cutting edges 81 of the blades 80; in other words the potato as it is shown, for example in FIGURE 5, is ultimately forced all the way through the blades 80 with the result that four slabs are removed from top and bottom, and both sides, leaving only the two end portions uncut; these end slabs are removed in the next operation. These blades are mounted on suitable supports 84, each of which is also corrugated upon its inner surface, as at 85, to match the "crinkle-cut" configuration 81 of blades 80.

Referring to the latter, a similar type of plunger mechanism and a similar method of mounting same is used to force the product through the second and third cutting stages. This pusher or reciprocating piston mechanism is represented by piston 95 (FIGURES 2 and 7 to 9).

The pusher or piston 95 is mounted within the casing 4 (represented by the two side walls 92–93 and front wall 94) and the latter, as in the former case, supported by suitable bolts 90 to the back wall 10. Also, as in the former case, a drive pin 96 seated within an appropriate aperture 97 in the piston 95, engages a like slot 95' in the back wall 10, the drive pin being permitted to reciprocate within this slot which is provided for that purpose. Also as in the former case, two opposed flanges or bushings 98 and 99 retain the drive pin 96 in the slot 95' in the same manner that the drive pin 25 of the first stage was secured.

Again the drive pin extends outwardly as at 100, the extension 100 providing the means for interconnection with a reciprocating mechanism, to be described, comprising a unique linkage arrangement. The latter provides a timed plunger drive, so synchronized as to receive successive potatoes from stage 1 after the latter have been slabbed as recited in the foregoing.

Figure 7:
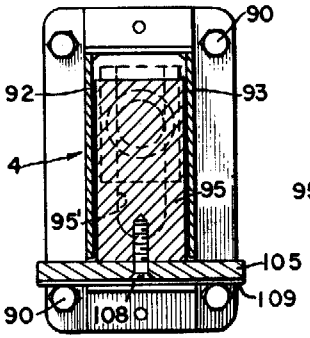
FIGURE 7 is a side elevation view taken along line 7—7 of FIGURE 8 of the second push rod mechanism for forcing the potato emerging from the slab cutter, into the second cutting position.

This second stage piston 95 is provided with a pressure pad 105 secured thereto by any usual means as by screw 106 (FIGURE 7). The pressure pad 105 has corrugations or depressions 109 cut into its face which match the corrugations or creases which have been cut into the sides of the potato by the slabbing operation.

Amount of movement of this piston 95 of the second stage is indicated in dotted line in FIGURE 7; in the preferred embodiment of the invention and as illustrative of the relative practical size of the assembly, the stroke of the piston 95 is about 2 inches, as compared with the stroke of the piston 18 of the first stage which in the preferred embodiment of the invention is of the order of about 9 inches.

As seen in FIGURE 2 the potato represented at B has been "squared," i.e., all six exterior sides have been removed by the slabbing operations. Thus, potato B has proceeded through the second cuting stage, consisting of removal of the end slab portions S. This is accomplished by movement of the pressure plate 105 downwardly to potato B where it is shown, this action causing impingement of the end portions of the potato upon two opposed cutting blades 110–111 secured by screws 115 to suitable base supports 116–117. Each of the blades 110–111 has a "crinkle cut" configuration, as indicated at 112–113. The supports 116–117 are also provided with matching corrugated surfaces 118–119 respectively. At this point, and as indicated above, the potato B as well as those potatoes preceding it have been sheared on all six sides, each cut leaving a wavy contour or "crinkle" therein.

Figure 13:
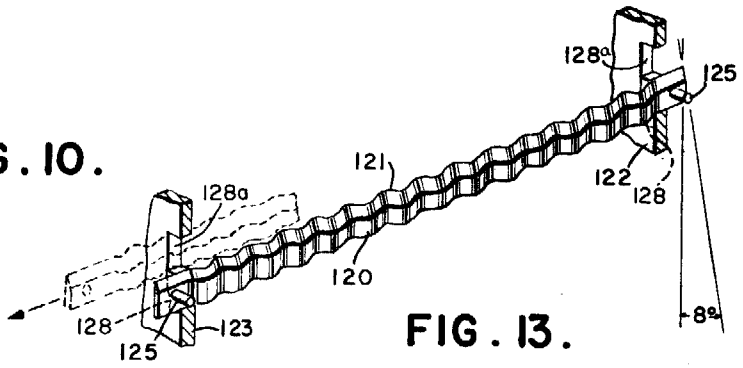
FIGURE 13 is an enlarged perspective view illustrating the manner in which each of the cutting elements is removably located in cutting position, and also indicating the slot means in each of the side supports through which the cutter element is drawn when removal is desired.

The third cutting stage is represented by a series of blades 120 which extend from side to side of the housing 6 and are secured in the opposed walls thereof, 122 and 123. The manner of attachment of these cutting elements 120, all of which of course have a sharp cutting edge 121, is illustrated in more detail in FIGURE 13. Here it is seen that a slot 128 is provided within which each end of such a blade rests. The blade is maintained in this slot by pins 125 which, when positioned in suitable apertures in the end portions of each blade, wedge against the respective side wall (as shown in FIGURE 13, side walls 122–123) and retain the blade in this cutting position. An additional slot 128a enables removal of such blades with a minimum of effort. The slot 128a is of greater depth and with the removal of the pins 125 the blade is moved upwardly and positioned in this deeper slot and then removed lengthwise, the depth of the slot 128 accommodating the extra width of the blade as represented by the corrugated contour thereof. The position and direction of removal is indicated in dotted line in FIGURE 13.

As seen in FIGURE 2 the potato C has been cut half way through into five separate segments by the four blades 120 there shown, each cut representing a "crinkle" cut; on the other hand the potato D has been completely cut into these five portions by this same action. It is to be understood that the thrust resulting in pushing of the potato through these blades results from the force imparted to the succeeding potatoes, i.e., C pushes D, B pushes C, etc.

Figure 12:
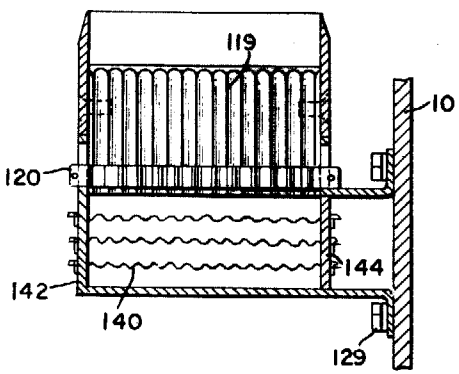
FIGURE 12 is a section view taken on the line 12—12 of FIGURE 11.

The final cutting stage is represented by the mechanism enclosed in housing 6, which is secured to the same baseboard 10 by nuts 129. As in the former cases, a similar type of piston element 130, having a right angularly disposed drive rod 131, is mounted for reciprocatory motion in the slot 132 formed in the back wall 10, the extension 133 fitted with the slot contacting bushings 134–135. The manner of mounting this pusher mechanism is identical to that as described with respect to stages 1 and 2. The cutting blades, here designated at 140 and also of the crinkle cut type, are aligned at right angles to the series of blades 120 heretofore described. However, they are positioned in exactly the same fashion as described with respect to FIGURE 13, suitable slots for this purpose being provided in the two side walls 142 and 144 (FIGURE 12).

Figure 10:
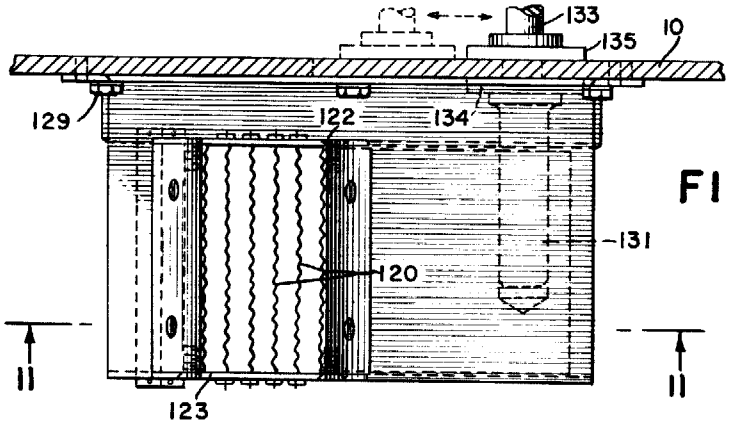
FIGURE 10 is a top plan view of the mechanism accomplishing the last cutting operation (as shown in the lower left of FIGURE 2) and illustrating the piston or pusher means for exerting thrust against the potato for the final cutting operation.

It should be evident that the purpose of the piston 130 is to successively force the bottommost of each slabbed and once sliced potato, as such are shown in FIGURE 2, through the series of three cutting knives 140, as here shown. The stroke of the piston 130 in the preferred embodiment of the invention, and as a matter of comparison with the pusher assemblies previously described, is about 2¾ inches. Such is indicated in dotted line in FIGURE 10. At any rate, the stroke is of that amount which will carry the piston 130 forwardly (or to the left as viewed in FIGURE 11) to a point just short of the blades 140. If the cut is not complete, such as illustrated in FIGURE 2 where the blades 140 have not completely severed all of the potato, then the succeeding potato, or that in position D as shown in this figure, when impulsed by the piston 130, completes the cut.

The result of the final cut made by these blades 140, which are likewise of a corrugated type to produce a "crinkle" cut product, is the production of twenty crinkle cut potato segments, as diagrammatically indicated in FIGURE 1. Each of these is "crinkled" on all four sides as well as at both ends.

The mechanism which is utilized to cause reciprocations of the pusher element 130 is synchronized with the other reciprocatory mechanisms used for a like purpose with respect to the first and second cutting stages. The desired result and that obtained through the unique lever drive arrangement of the invention is the rapid and sequential cutting of a steady flow of potatoes through the entire assembly.

Figure 14:
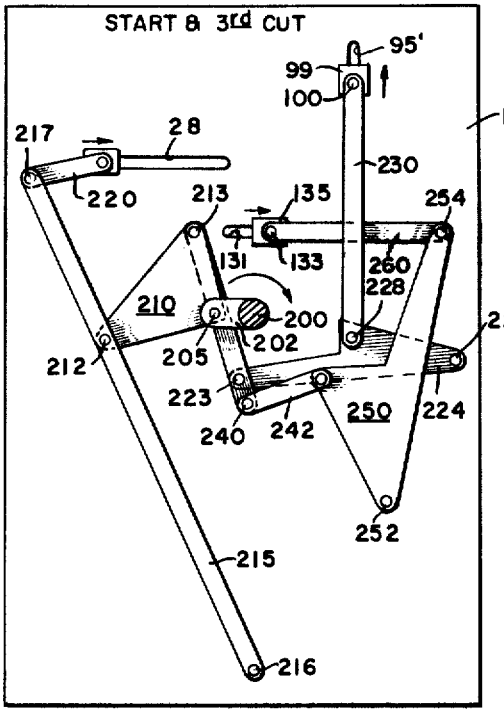
FIGURE 14 is a rear view of the invention as it is shown in FIGURE 2, illustrating the unique linkage arrangement by which the several reciprocating pistons are motivated for cutting purposes, and also indicating the relationship of such link arrangement in the start and third cutting positions.
Figure 15:
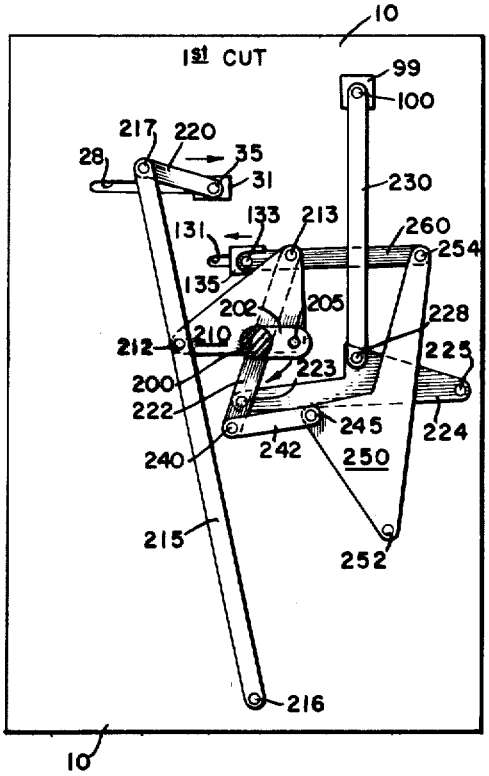
FIGURE 15 is a view similar to FIGURE 14 but showing the drive linkage in the first cutting position.
Figure 16:
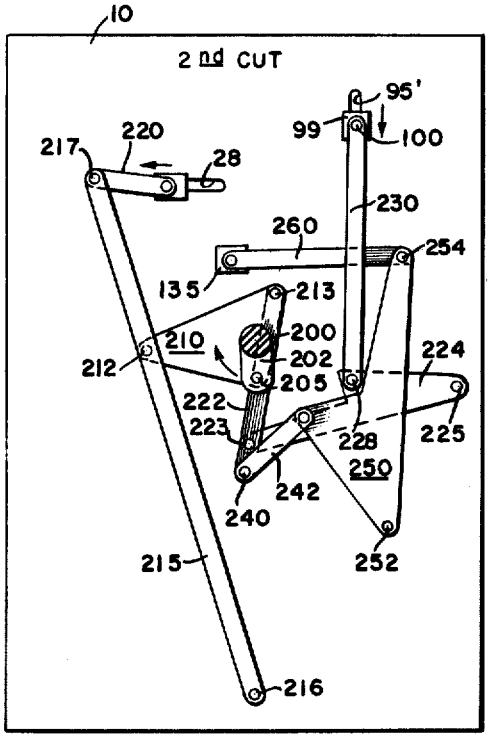
FIGURE 16 is a view similar to FIGURES 14 and 15, but showing the same drive linkage arrangement in the second cutting position.

Referring to FIGURES 14, 15 and 16, there is here shown the unique type of drive linkage that is utilized to reciprocate the several pistons (18, 95 and 130) in a timed and coordinated fashion, so that the first, second and third cuts as they have been described above are attained in a sequential and continuous manner. As indicated in the foregoing, FIGURE 14 shows the relationship of the various links and pivots in the start and third cutting positions thereof, whereas FIGURE 15 illustrates the first cutting position and FIGURE 16 the second cutting position. The entire movement of the three different reciprocating pistons, through the system now to be described, is obtained by rotation of a common drive shaft 200 which, although rotating in the same clockwise direction (as indicated in these figures), provides for timed reciprocations of the three pistons. In the relationship shown, one complete revolution of the shaft 200 will provide for one reciprocation of all three of the involved pistons—18, 95 and 130.

In viewing these figures, it is to be understood that the linkage drive is illustrated in a position reverse to that portion of the mechanism as it is shown, for example, in FIGURE 2, i.e., the linkage system is mounted upon the reverse side of the baseboard 10.

The operation of the linkage system will be described in the same order as the foregoing description made with respect to the several piston members, i.e., the first cutting action representing reciprocatory movement of piston 18, the second reciprocatory movement of piston 95, and the third and final cut being represented by the reciprocatory movement of piston 130.

All of the various linkage elements are, as stated, driven by a common shaft 200 which can be driven at an r.p.m. to obtain as rapid or as slow an operation as may be desired. The shaft is mounted in suitable bearings (not shown) and the drive for the linkage arrangement emanates from a crank arm 202 which is affixed to such shaft and rotated thereby. This crank 202 is interconnected with a triangular bell arm 210 through pivot pin 205 mounted in one corner of such plate 210.

The first cutting action is represented by reciprocations of piston 18 which receives appropriate reciprocatory movement by correlated movement of plate 210. The latter is interconnected with piston 18 in the following manner: elongated link 215 is pivoted as at 216 to the baseboard 10, and approximately two-thirds the distance from this pivot point 215, an additional pivot 212 interconnects the link as lever 215 with the left hand point of plate 210. The opposite end of link 215, through pivot 217, is engaged with an additional linkage 220, and the latter suitably apertured to receive shaft 35, which as explained above, is directly connected to the piston 18. Link 220 is of course pivotally engaged with such shaft 35 so that the former may freely rotate with respect to the latter during the reciprocatory motions thereof.

Hence, it will be seen that as the crank arm 202 is rotated link 215 will be correspondingly oscillated and with a corresponding oscillation or reciprocation of piston 18.

In the position shown in FIGURE 14, the assembly, as stated, is in the start and third cut position. Insofar as piston 95 be concerned, this piston is fully retracted or in the position shown, e.g., in FIGURE 4, thus located to receive a single potato from the hopper 1.

The second cutting mechanism, represented by the reciprocations of piston 95 which drives the potato through slabbing knives 112–113, as well as through slicing cutters 120, is motivated through a suitable linkage which is also interconnected with the triangular plate member 210. In this instance, a pivot pin 213 on plate 210, opposed to the pivot 212 (pivots 212 and 213 respresenting the hypotenuse of this triangular plate 210) is interconnected with an intermediate lever or link 222. Near its lower end, this link 222 is provided with pivot pins 223 and 240, the former of which engages in pivoted fashion, one end of an additional cam plate or bell arm 224. The opposite end of the cam plate 224 is pivoted as at 225 to the baseboard 10. The cam plate 224 is of a configuration such that the resultant reciprocations produced thereby are of the desired length. Also, there is provided a raised center portion in this cam plate 224 for avoidance of cam 250 and for reception of an additional pivot 228 which interconnects to link 230. The link 230 in turn engages, in pivoted fashion, the pivot rod 100, previously described, the latter being in direct connection with piston 95, the reciprocating means for the second cutting stage.

Regarding oscillations or reciprocations of this piston 95, it will be thus seen that as the crank arm 202 is rotated through rotation of shaft 200, corresponding movement is imparted to cam plate 224 through link 222, and this movement transmitted, in the form of reciprocations to link 230. In the first cutting position as shown in FIGURE 15, the described linkage drives the drive pin 100 to its top vertical position; however, with further rotation of the crank arm 202 to the position shown in FIGURE 16, the link 230 has been caused to descend downwardly with resultant downward motion of the piston 95, thus pushing a preceding potato, as potato D, through the first series of slicing knives 120.

Again, the same triangular cam plate 210, and same link 222 attached to pivot 213 of cam plate 210 is utilized to perform a timed cutting action or reciprocatory movement of the third piston 130, which as hereinbefore explained obtains the final cut as the same is illustrated in, e.g., FIGURE 1. To this end, the link 222 is provided with the aformentioned additional pivot 240, extending somewhat below pivot 223 and being located at the extreme end of link 222. This additional pivot 240 provides support for a further link 242 which by pivot 245 is interconnected to the raised triangular portion of pivot plate 250. The latter, as in the other instances, is pivoted at its lower end to the common baseboard 10, as by pivot 252. One side of this pivot plate 250 is elongated as indicated in FIGURES 14 to 16 and its greatest length is represented by the opposed pivots 252, already mentioned, and pivot pin 254. The pivot 254 is interconnected with a further link or lever 60 and the latter directly attached for pivoted motion with respect thereto, to pivot rod 133, which as also described above, is directly secured to the third reciprocating piston 130.

In FIGURE 14, the connecting rod 133 and piston 130 are shown in the fully retracted position; however, in FIGURE 15 such piston 130 has been fully extended to make the final cut. It is shown in this position on the reverse side of the baseboard in FIGURE 2.

The described linkages are so proportioned that these several cutting operations are obtained in rapid sequence. In FIGURE 4, for example, the mechanism is shown at the start of its operation. The linkage system is depicted in its corresponding position in FIGURE 14. Here piston 18 is fully retracted, piston 95 is commencing its return stroke, and piston 130 is completing an extended or cutting stroke. Because piston 18 is fully retracted as shown in FIGURE 14, this figure is representative of the starting cut, and also because piston 130 is in its fully extended position, this figure also represents the third cut of the operation.

The first cut is illustrated, with the relative position of the linkage arrangement and piston, in FIGURE 15. Here piston 18 is fully extended and thus has positioned the initial potato, as potato A, FIGURE 2, completely through the first cutting elements 81. In this position of the linkage arrangement, piston element 95 is in its uppermost or retracted position, whereas piston 130 is being retracted in preparation for a following, final cutting operation.

In FIGURE 16, the second cut is illustrated. Here piston 95 is in its fully downward or extended position with the result that potato D has been completely pushed through the cutting elements 120. At the same time, piston 18, through levers 215 and 220, is being retracted to receive a further potato, and piston 130, through lever 260, is commencing to move downwardly to perform the second cutting operation.

It is to be observed that showings of this linkage arrangement of FIGURES 14, 15 and 16 are in much smaller scale than the figures illustrating the opposite side of the mechanism. However, the proportions of the links, and the relative proportions of the three pivot plates, as 210, 224 and 250, are all represented in proper relationship. In other words, if these proportions as they are shown in FIGURES 14 to 16 are retained, the movement of the mechanism, irrespective of its relative size, will be the same with the same consequent timed correlated reciprocatory movements.

Alternatively stated, it is to be observed that the showing of the link mechanism as found in FIGURES 14 to 16 inclusive represents a full disclosure thereof in this sense; these figures are drawn to scale; the various bell arms and the various links interconnecting the same with the three piston means are thus proportionate to each other. This is particularly true with respect to the pivot point to pivot point distances. Hence, if these proportions be followed, the same automatic and timed sequence will occur even though the mechanism be very substantial in over-all size. This is true with respect particularly to the shape of the three bell arms 210, 224 and 250. The first represents a simple right triangular configuration with the pivot 205 positioned in the apex of right angularity; the bell arm 224 has a mid portion of greater width affording space for the pivot 228; and the bell arm 250 is provided with a triangular shaped head with an upwardly extending arm to which the link 260 is attached. Definite proportions are shown in these figures with respect to the various links interconnecting each of the bell arms with the three piston rods 35, 100 and 133. If these links are proportioned, no matter what the size of the over-all unit, to the proportions indicated in FIGURES 14 to 16, the described operation will necessarily follow—a timed sequence with a start position of FIGURE 14, a first cut position of FIGURE 15 and a second cut position of FIGURE 16 and a third cut position (again) of FIGURE 14. These FIGURES 14 to 16, are thus set forth herein as a full and self-explanatory description of the linkage system; those skilled in the art will readily appreciate that by suitable scaling of these representative sizes to a size for practical usage, the described functions will be obtained.

It will be also recognized by those skilled in the art that the crux of the assembly lies in the scaled distances from pivot point to pivot point. In the instant example of the invention reference has been made to cam plates or bell arms such as those shown at 210, 224 and 250 which control the first, second and third cutting stages respectively. However, instead of the exact configuration of such cam plates as here shown, alternate structures may be utilized so long as the three respective pivot points (as to relative distances) of each of such cam plates are retained in the relative locations indicated in FIGURES 14 to 16 inclusive. In the instant disclosure of these cam and linkage arrangements, and as generally indicated in these figures, it is to be appreciated that the several cam plates or bell arms are located in different planes, all parallel to the plane of the base plate 10, thus permitting movement of same and movement of the interconnecting linkages, without constriction. Thus, and as here indicated, cam plate 210 lies in the outermost plane, cam 224 is positioned in a plane immediately adjacent base plate 10, and the cam plate 250 is positioned in a plane intermediate those of 210 and 224.

It is also to be understood that other media may be employed for this purpose such as pneumatic or hydraulic power drives; in the latter event, however, the same would necessarily have to be timed by such comparatively complex mechanism as timing mechanism for electrically controlled solenoids, etc. In contrast in the instant case, the entire linkage arrangement represents the essence of simplicity, considering the fact that three different movements are required with each movement being of a predetermined amount and different in this regard than the other movements; also each movement differs from the other two in that it occurs in the cycle of the operation at a different frequency. A further advantage of this unique arrangement is that the entire mechanism can be motivated through a single power source, i.e., the rotation of a single shaft, here shaft 200. Hence the operation can be accelerated or decelerated to reach an optimum degree of speed resulting in a proper cutting action without damage to the involved product.

It will be appreciated that the foregoing description has been confined to a mechanism for the production of crinkle cuts and for this purpose the blade elements are of the necessary configuration—that is corrugated, as shown in FIGURE 13. However, the ordinary type of French fried potato, that is with flat sides, can be produced simply by the interchange of the blade elements, the cutters such as 120 and 140 being replaced by straight edged cutters. Similarly, when such a product is desired the slab cutting elements such as blades 80 and 110 can be supplemented by similar blades, but with straight cutting edges.

Another variation in the operation of the mechanism is the production of diced or cubed potatoes—a desirable product not only as one for immediate consumption but for use in such prepared foods as soups and stews. In any event, the only variation which is needed to produce the diced product is the addition of more cutting elements in the fourth stage of cutting, or a series of straight edge cutting blades positioned in the area where the blades 140 are locked in place. If dicing is desired, then these additional blades will be disposed between the top and bottom members of the housing here indicated (FIGURE 11) at 150 and 151 respectively. The addition of three such blades, spaced the required distance apart, will produce an additional cut, resulting in the diced or cubed product.

Figure 11:
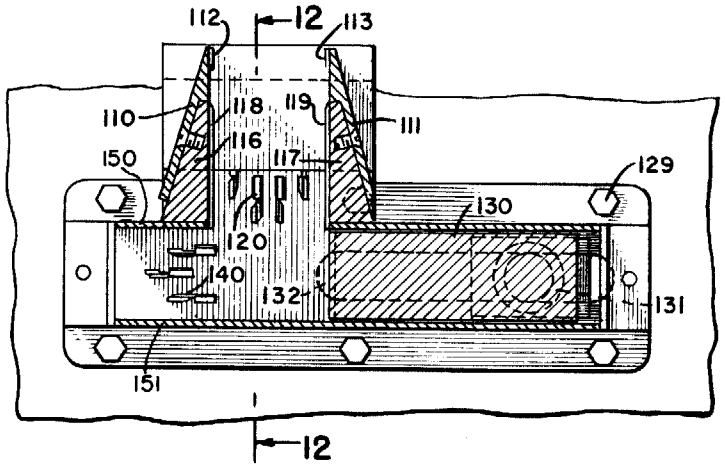
FIGURE 11 is a section view taken on the line 11—11 of FIGURE 10.

As noted in the foregoing, the blade depicted in FIGURE 13 has a preferred cutting edge forming an angle of about 8°, as there indicated. Although the blade here depicted is one for the cutting of crinkle cut potatoes, this angularity of the cutting edge is also preferred if the blade be of straight type, experimentation having demonstrated that such blades must be of substantial thickness to withstand high speed cutting operations without substantial damage to the cellular structure of the tuber. As also mentioned in the foregoing, and for example viewing FIGURE 11, it is seen that the blades on each side of the center line are disposed with the flat sides thereof parallel to such center line and with the angularity of the cutting edge extending away from the center line. As indicated in FIGURES 2 and 11, the two center blades 120 are in a different plane than the two outer blades; also with respect to blades 140 the two outer blades are forwardly of the center blade. These several features of construction, as demonstrated by actual operating conditions, are conducive to the obtaining of a cleaner cut, the prevention of "jamming" of the product, or undue compression or mashing of same during the relative high speed operation which is here contemplated.

From the foregoing it will be seen that we have provided a means and method for the rapid and efficient processing of a given vegetable product into a predetermined number of sizes and shapes. As indicated, a primary advantage of the invention is the production of sliced products which represent only the more desirable center cut portions of the vegetable, which are purer in the sense that defections in the initial vegetable have been removed, and which therefore represent a more desirable and more readily marketable end product. In addition the method of the invention involves a mechanical assembly representative of the essence of simplicity yet extremely efficient in the processing of such vegetables, as potatoes, in the sense that the entire operation is conducted with extreme rapidity so that thousands of pounds of the tuber can be so prepared within an extremely short period of time.

It is apparent that many modifications and variations may be made to the invention; however, the scope of the invention is not to be deemed limited in any manner whatsoever except as same is restricted by the specific limitations which are set forth in the appended claims.

I claim:

1. In a cutting assembly for cutting vegetable products into predetermined shapes including crinkle cut shapes, [a series of side] slab cutting elements [,] *for removing some of the side slabs from the product,* a first reciprocating piston means to successively thrust said products through said elements in single line fashion, [end] *additional side* slab cutting elements *for removing the remainder of the side slabs from the product* disposed to receive said products in series with said first named cutting elements, spaced and parallel cutting knives adjacent said [end] *additional side* slab cutting elements to sever said products in one direction into a plurality of center cuts, spaced and parallel cutting means adjacent to said cutting knives and right angularly disposed to said one direction, a second reciprocating piston means to force said products through said [end] *additional side* slab cutting elements and said cutting knives, and a third reciprocating piston means to force said products through said right angularly disposed cutting means, said first, second and third piston means being sequentially timed with respect to each other.

2. In a cutting assembly for cutting vegetable products into predetermined shapes including crinkle cut shapes, a sequential slabbing and cutting system comprising a series of four side slab cutting elements mounted for horizontal cutting action, a first reciprocating means to successively thrust each of said products sequentially through said elements, two end slab cutting elements disposed at right angles to said side slab cutting elements and adjacent thereto, spaced and parallel cutting knives adjacent said end slab cutting elements to divide said products into a plurality of center cuts, a second reciprocating piston means to drive said products through said end slab cutting means and said cutting knives, spaced and parallel cutting means adjacent to said cutting knives and right angularly disposed to said one direction, and a third reciprocating means to force said products through said right angularly disposed cutting means to further sever said products into an additional number of center cuts.

3. The invention as defined in claim 2 including timing means to automatically time and synchronize said first, second and third reciprocating means so that the operation of said assembly is continuous.

4. In a cutting apparatus for cutting potatoes into diced, string French fried or crinkle cut shapes, a sequential slabbing and segmenting system comprising a first, second and third cutting assembly, a cuting means in each assembly and reciprocating thrust means for forcing potatoes successively through each of said cutting means, said cutting means of said first assembly comprising horizontally disposed side slab removing cutters, said cutting means for said second assembly comprising vertically disposed end slab cutters and primary center slicing cutters, and said cutting means for said third assembly comprising secondary center slicing cutters, said last named cutters being positioned for cutting in a direction right angularly to said primary center slicing cutters, said thrust means for said first assembly positioning a potato before said thrust means of said second assembly, and said thrust means for said second assembly positioning a potato before said secondary center slicing cutters.

5. The invention as defined in claim 4 wherein said respective thrust means successively operate to continuously and sequentially pass a series of said potatoes individually through each of said cutting stages.

6. The invention as defined in claim 5 wherein a guide means is positioned in advance of said cutting means of said first stage said guide means comprising interconnected opposed guide members, said guide means aligning said potatoes in center position for direct impingement upon said first assembly cutting means.

7. The invention as defined in claim 4 wherein each of said cutting means comprises straight edge cutters for producing flat surfaced potato slices.

8. The invention as defined in claim 4 where each of said cutting means comprises corrugated edge cutters for producing crinkle cut potato slices.

9. In a potato cutting mechanism for the production of cubed, string French fried or crinkle cut potatoes, a horizontal reciprocating pusher mechanism, a hopper for successive discharge of potatoes before said mechanism, a side slab cutter assembly positioned in front of said pusher mechanism *for removing some of the side slabs from the product,* each of said potatoes being forced through said cutter assembly by said pusher mechanism whereby [the] *said some of said* side slabs are removed, a vertically reciprocating piston disposed forwardly of said cutter assembly having a pusher plate thereon, said pusher mechanism causing said *partially* side slabbed potatoes to be successively positioned under said pusher plate, *additional* [end] *side* slab and primary center slice cutters under said pusher plate, said pusher plate successively forcing each of said potatoes through said last named cutters, a horizontally disposed piston means adjacent and under said last named cutters, said pusher plate successively positioning said potatoes in front of said last named piston means, secondary center slice cutters disposed right angularly to said primary center slice cutters and in advance of said last named piston means for making additional center cuts, whereby said potatoes are successively [side slabbed, end slabbed,] *slabbed upon all sides,* center cut in one direction, and center cut in a direction right angular to said one direction.

10. A method for the continuous and sequential cutting of a food product into string French fried and crinkle cut shapes comprising initially removing [four] *a partial number of side* slabs from the exterior of said product, passing said product to an [end] *additional side* slab removal zone [and] *for* removing [said end] the *remaining side* slabs from said product, passing said product through a center slab cutting zone in a direction to sever said product into multiple center cut slabs, passing said center cut slabs through an additional center slab cutting zone in a direction at right angles to said first direction to divide said center cut slabs into additional center cut segments, and discharging said center cut segments from said last named zone.

11. The method as defined in claim 10 wherein said product is passed to a centering zone for centering said product prior to admission to said initial slab removal zone.

12. In a cutting assembly for cutting vegetable products into predetermined shapes, including crinkle cut shapes, the combination comprising a series of pairs of side slab cutting elements, reciprocating piston means to successively thrust said products through said pairs of elements to sever side slabs from said product and produce a substantially rectangular shaped segment therefrom, a first set of spaced and parallel cutting knives for severing said segment in one direction into a plurality of center cuts, reciprocating piston means for forcing said segment through said first set of knives, a second set of spaced and parallel cutting knives right angularly disposed to said one direction for slicing said center cuts into a plurality of strips, and reciprocating piston means for forcing said center cuts through said second set of knives.

References Cited

The following references, cited by the Examiner, are of record in the patented file of this patent or the original patent.

UNITED STATES PATENTS

| | | | |
|---|---|---|---|
| 690,512 | 1/1902 | Boos | 146—169 |
| 2,291,449 | 7/1942 | Burgess et al. | 146—169 |
| 2,303,595 | 12/1942 | Young | 146—78 |
| 2,677,403 | 5/1954 | Brown et al. | 146—78 |
| 3,057,386 | 10/1962 | Massaro | 146—78 |
| 3,109,468 | 11/1963 | Lamb et al. | 146—78 |
| 1,046,551 | 12/1912 | Cass | 146—169 X |
| 1,337,968 | 4/1920 | Schroeder. | |
| 1,449,040 | 3/1923 | Hany | 146—169 |
| 2,088,298 | 7/1937 | Love | 146—178 |
| 3,030,992 | 4/1962 | Picard. | |

W. GRAYDON ABERCROMBIE, Primary Examiner

U.S. Cl. X.R.

146—78